May 28, 1935.  H. V. BOWMAN  2,003,134
BOTTLE CRATE
Filed Oct. 26, 1934  6 Sheets-Sheet 1

INVENTOR
HENRY V. BOWMAN
BY Paul, Paul Moore
ATTORNEYS

May 28, 1935.　　　　H. V. BOWMAN　　　　2,003,134
BOTTLE CRATE
Filed Oct. 26, 1934　　　6 Sheets-Sheet 2
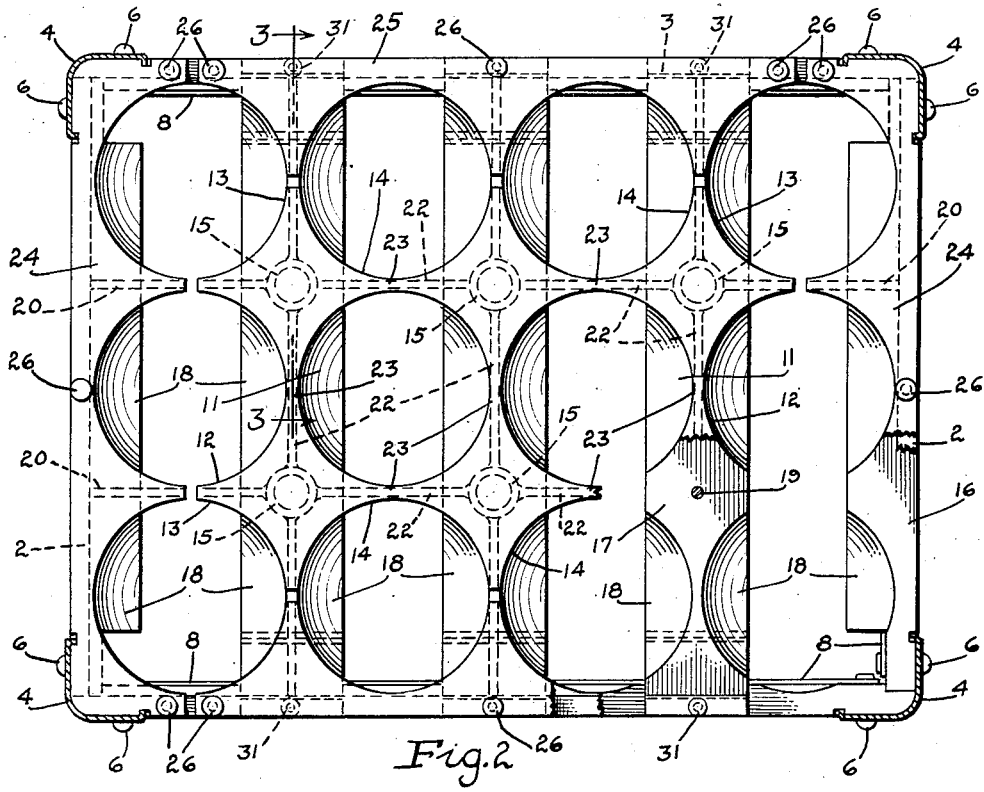
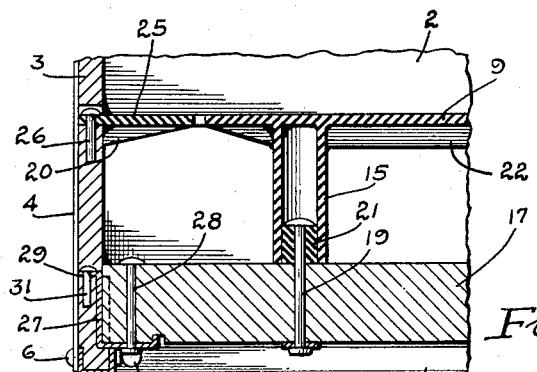
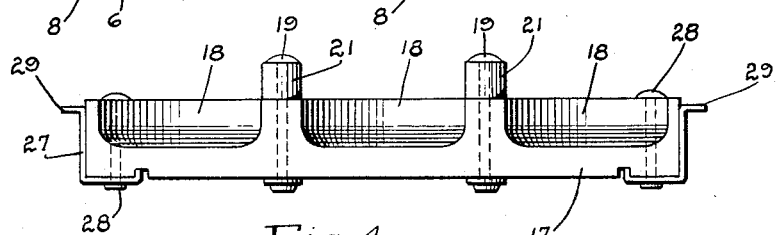
INVENTOR
HENRY V. BOWMAN
BY
ATTORNEYS May 28, 1935.  H. V. BOWMAN  2,003,134
BOTTLE CRATE
Filed Oct. 26, 1934    6 Sheets-Sheet 3
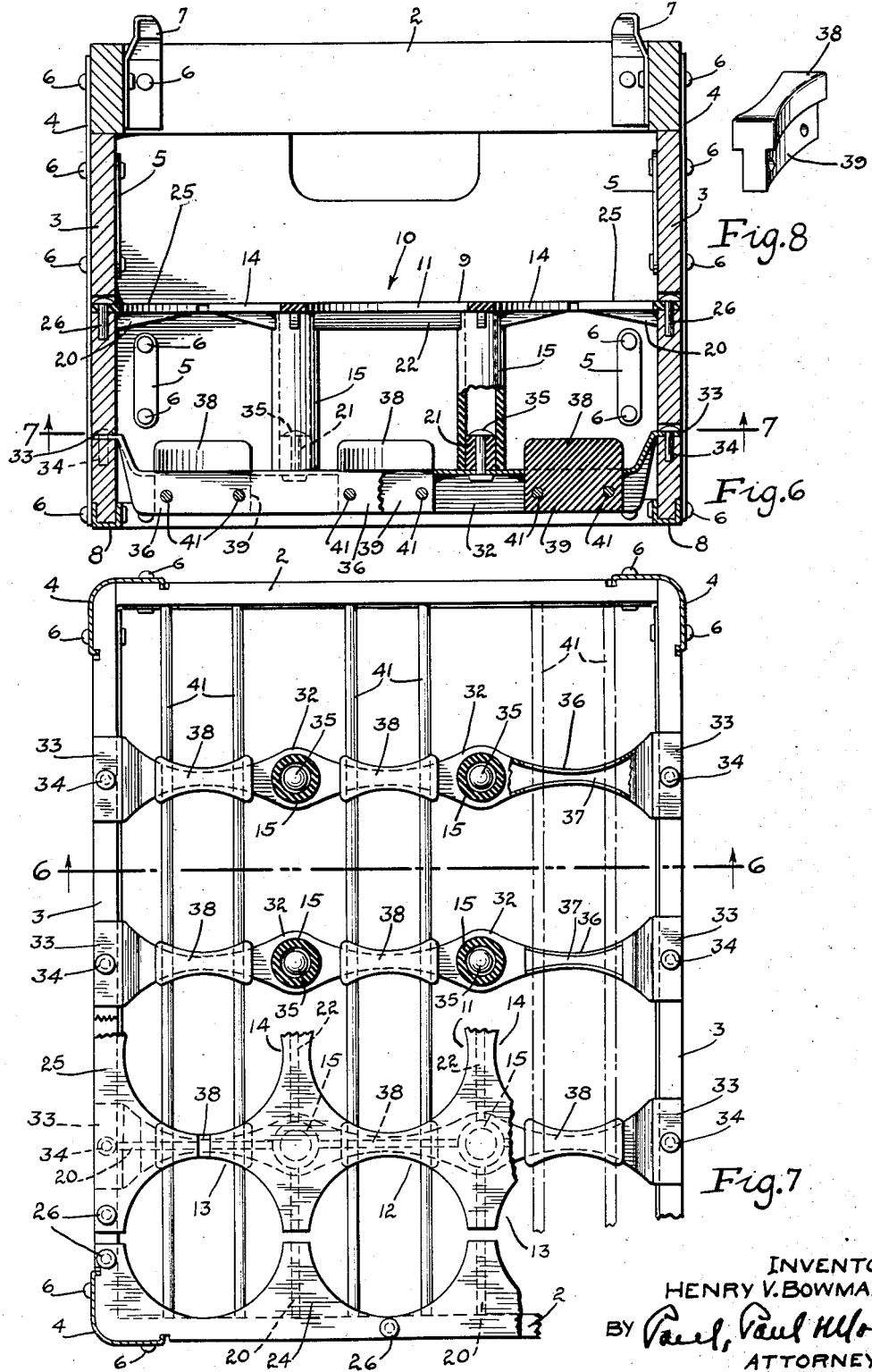
INVENTOR
HENRY V. BOWMAN
BY *Paul, Paul H Moore*
ATTORNEYS May 28, 1935.  H. V. BOWMAN  2,003,134
BOTTLE CRATE
Filed Oct. 26, 1934  6 Sheets-Sheet 4
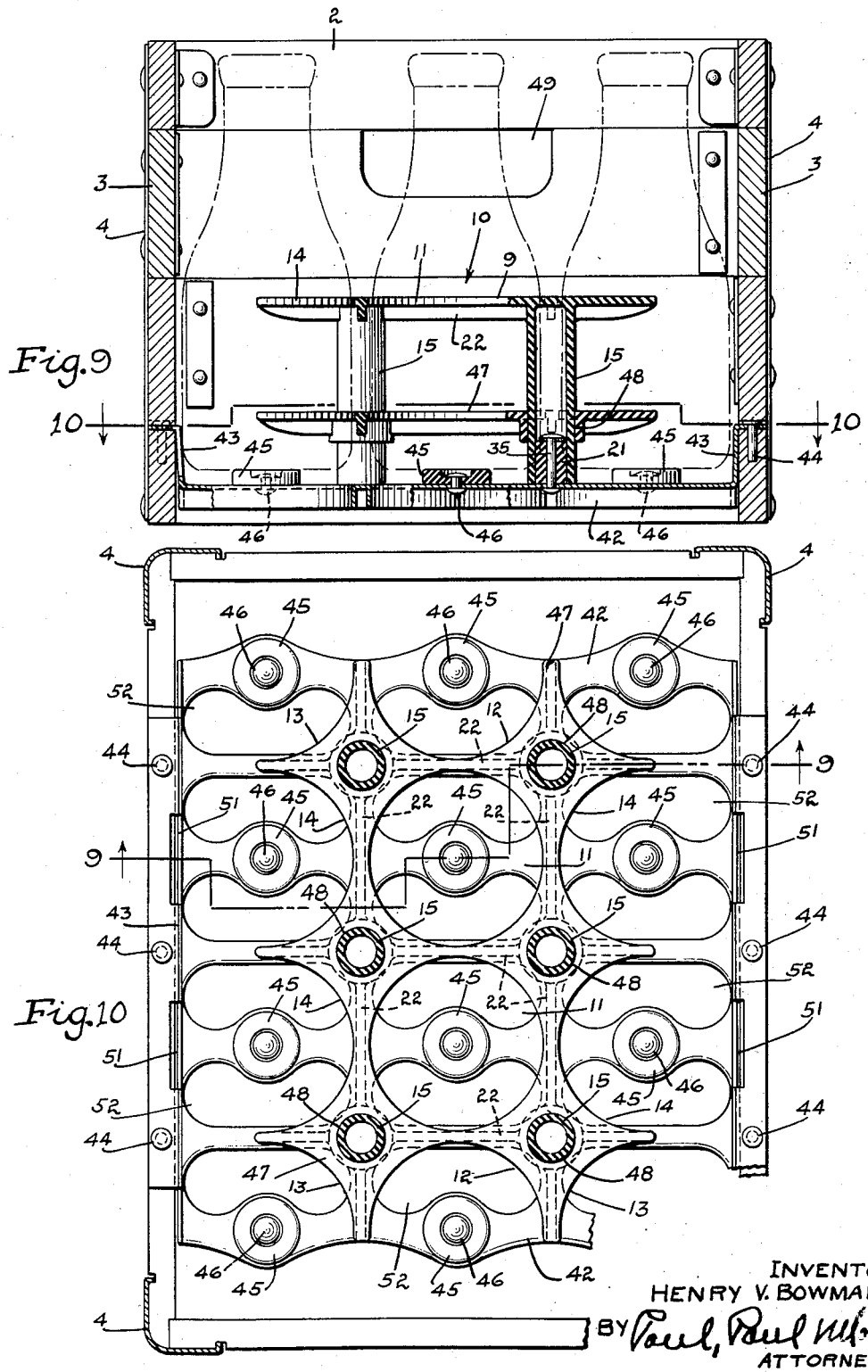
INVENTOR
HENRY V. BOWMAN
BY Paul, Paul & Moore
ATTORNEYS

INVENTOR
HENRY V. BOWMAN
BY
ATTORNEYS

May 28, 1935.  H. V. BOWMAN  2,003,134
BOTTLE CRATE
Filed Oct. 26, 1934   6 Sheets-Sheet 6

INVENTOR
HENRY V. BOWMAN
BY
ATTORNEYS

Patented May 28, 1935

2,003,134

UNITED STATES PATENT OFFICE 2,003,134

BOTTLE CRATE

Henry V. Bowman, Minneapolis, Minn., assignor to Bowman Products, Incorporated, St. Paul, Minn., a corporation of Minnesota Application October 26, 1934, Serial No. 750,190

21 Claims. (Cl. 217—19)

This invention relates to new and useful improvements in bottle crates, generally, and more particularly to the means provided in such a crate for spacing apart the bottles therein, commonly known as the grid.

An object of the invention is to provide a bottle crate comprising a non-breakable, rust-proof grid, capable of withstanding rough usage.

A further object is to provide a grid for a milk crate composed mainly of non-metallic material, whereby the bottles will not contact directly with metal, as is now common in ordinary milk crates, and whereby the peripheries of the bottles are not likely to become damaged or marred by scratches and rust stains often resulting when contacting directly with metal grids.

A further object is to provide a grid for a bottle crate comprising an upper horizontally disposed plate member having spaced openings therein adapted to receive the bottles to thereby retain them in spaced relation in the crate.

A further object is to provide a grid comprising an upper horizontal plate portion supported upon the bottle-supporting means in the bottom of the crate, and other means projecting inwardly from the walls of the crate and cooperating with said plate member to provide a series of circular openings each adapted to receive a bottle whereby the bottles in the crate will be spaced apart, and said bottle spacing means being formed from a non-metallic material capable of flexing and yielding, when subjected to abnormal strains, whereby the grid is not so likely to become damaged from rough handling, when in use.

A further object is to provide in combination with the walls of a bottle crate, a grid or bottle spacing means including a horizontally disposed plate member constructed of a suitable non-metallic yieldable material, having openings therein for receiving the bottles, and whereby the spaces or gaps between the bottles are substantially closed, to thereby permit chipped or broken ice to be supported upon said bottle spacing means between the bottles.

A further and important object of the invention is to provide a strong, durable, rust and water-proof grid for a bottle crate, which is supported entirely upon the bottom of the crate, and has no direct connections with the vertical walls thereof, whereby the crate walls are substantially free from obstructions which might interfere with the operation of cleaning the inner surfaces thereof.

Other objects of the invention reside in the specific construction of the bottle spacing means, which comprises a horizontal plate member having openings therein for receiving the bottles, and which plate portion is supported directly upon the bottle supporting means of the crate, said plate member and its supporting means being integrally formed or molded from a suitable resilient material such, for example, as rubber, whereby it may yield and flex when subjected to abnormal strains; in the provision of a grid comprising an upper horizontal plate portion supported directly upon the bottom of the crate by tubular posts, preferably integrally formed therewith, and which are flexible to thereby permit the upper plate portion of the grid to yield when subjected to lateral strains; in the provision of a grid composed of a plurality of yieldable sections mounted one upon the other and suitably secured together to provide a unitary structure of sufficient height to support the bottles in either an upright or inverted position; and in the provision of a simple and inexpensive grid structure for crates, which may be molded from rubber to provide a unitary one-piece structure having the inherent characteristic of being substantially non-breakable and waterproof, and which will not scratch or mar the peripheries of the bottles contacting therewith.

A further object is to provide a bottle crate comprising a bottom member formed from a single piece of sheet metal and having a suitable grid supported directly thereon and spaced from the walls of the crate to facilitate cleaning the latter, and means being provided whereby the bottles do not contact directly with said metallic bottom member; and, in the provision of a bottle crate of simple and inexpensive construction comprising a grid structure, the major portion of which is formed from a suitable non-metallic material capable of yielding or flexing, when subjected to abnormal strains, and said grid also cushioning the bottles in the crate, whereby said bottles cannot rattle or become noisy in the crate, when being transported over rough road surfaces.

The particular object of the invention, therefore, is to provide an improved grid for bottle crates, which is simple, easy and economical to manufacture, is substantially noiseless when in use, and which is so constructed that it cannot mar or stain the bottles as a result of contacting therewith.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

In the drawings:

Figure 2 is a plan view of Figure 1, partially broken away to more clearly illustrate the construction of the bottom portion of the crate;

Figure 3 is a detail sectional view on the line 3—3 of Figure 2;

Figure 4 is a detail view showing one of the cross members in the bottom of the crate removed therefrom;

Figure 6 is a vertical sectional view on the line 6—6 of Figure 7, showing the grid supported upon metallic cross members which constitute the bottom of the crate;

Figure 7 is a horizontal sectional view substantially on the line 7—7 of Figure 6;

Figure 8 is a perspective view showing one of the cushion elements removed from the crate;

Figure 9 is a vertical sectional view on the line 9—9 of Figure 10, showing a grid of slightly different construction;

Figure 10 is a sectional plan view substantially on the line 10—10 of Figure 9;

Figure 1:
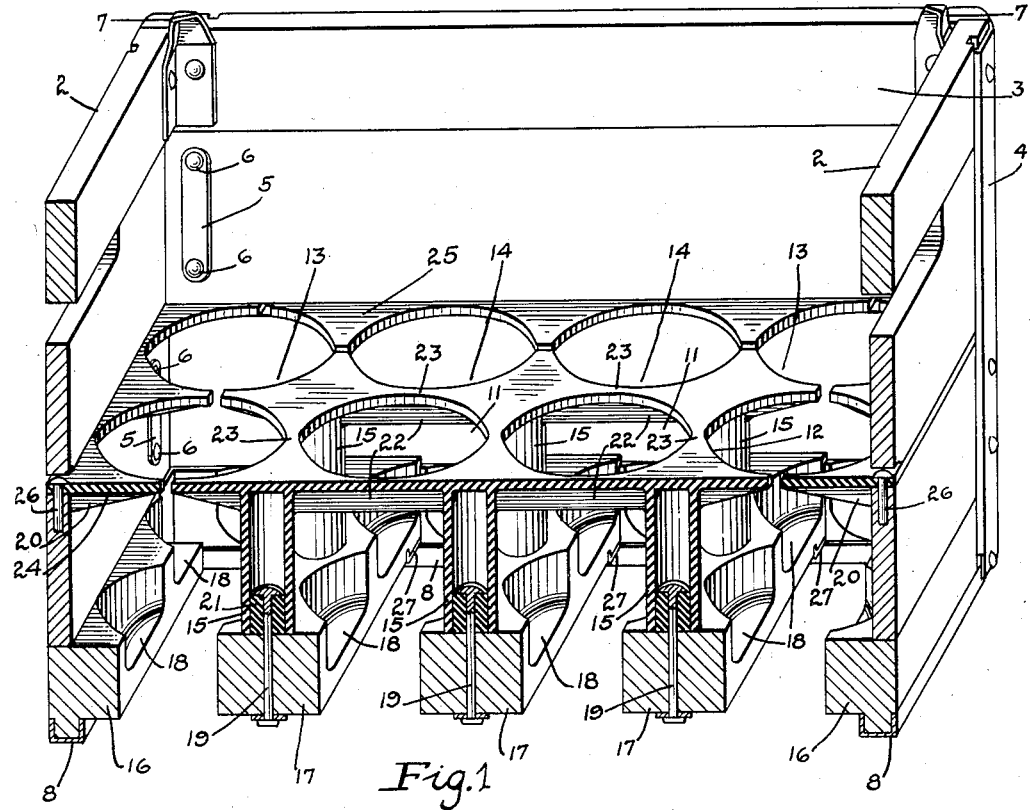
Figure 1 is a perspective view, partially in section, showing a crate with my improved grid embodied in the construction thereof.

In the selected embodiment of the invention here shown, there is illustrated in Figure 1, a crate of the general type disclosed in my pending application, Serial No. 725,500, filed May 14, 1934, and which comprises suitable end walls, generally indicated by the numeral 2, and side walls indicated by the numeral 3. The end and side walls are suitably secured together by corner irons 4, and metallic straps 5, seated against the inner surfaces of the slats, which constitute the walls of the crate, and suitable rivets 6, as is customary in structures of this type. Suitable brackets 7 are shown provided at the top corners of the crate, and project above the upper edges of the walls thereof to form means for nesting the crates together, as is well-known.

The lower edges of the end and side walls of the crate are preferably provided with suitable channel rails 8, which reinforce the lower edges of the walls, and reduce wear to a minimum. The vertical walls of the crate are shown constructed of suitable slats, as is common practice in structures of this general type.

An important feature of the invention resides in the means provided in the crate for spacing apart the bottles therein. In the preferred embodiment of the invention, the bottle spacing means or grid, as it is commonly called, comprises a horizontal plate member 9, preferably molded of a suitable non-metallic material such, for example, as rubber, having suitable openings 11 therein for receiving the bottles. The edges of the plate 9 are cut away, as indicated at 12, 13 and 14, to provide cut-away portions adapted to receive the bottles positioned adjacent to the walls of the crate, as best shown in Figure 2.

The plate portion 9 has integrally formed therewith, a plurality of tubular posts 15, which extend downwardly therefrom and are adapted to be supported directly upon the bottom of the crate which, as shown in Figures 1 and 2, comprises a plurality of cross members 16 and 17. In the drawings, I have shown the end cross members 16 as forming the lower portions of the end walls of the crate, but it is to be understood that if desired, the lower portions of the end walls may be formed of slats having suitable cross members 16 secured thereto.

The cross members 16 and 17 are provided with recesses 18 which are alined, as shown in Figure 2, and are adapted to receive the bottoms of the bottles to thereby support the latter in the crate. The tubular posts 15 of the grid plate 9 are shown secured to the cross members 17 by suitable rivets or bolts 19, received in apertures provided in the cross members 17 and having their upper ends engaged with suitable plugs 21, preferably of rubber. These plugs are adapted to be received in the lower ends of the tubular posts 15, as clearly illustrated in Figures 1 and 3, and are secured thereto by a suitable gum or adhesive, whereby the grid plate 9 is securely supported in the crate and directly upon the cross members 17, whereby they will have no direct connections with the side walls of the crate. By thus supporting the grid in the crate, the inner surfaces of the crate walls may readily be cleaned.

The entire grid, comprising the plate member 9 and the tubular posts 15, are constructed of rubber, as hereinbefore stated, and are preferably integrally molded into one unitary structure, which is sufficiently flexible to permit the grid to yield, when subjected to abnormal strains, whereby the danger of breakage is greatly minimized. The grid, because of its unitary structure, may be quickly assembled in a crate by simply fitting the lower ends of the tubular uprights or posts 15 over the plugs 21 of the cross members 17. The horizontal plate member 9 of the grid is preferably ribbed, as indicated at 22, as shown in Figures 1 to 5, inclusive, to thereby strengthen the reduced portions 23, which constitute the spacing means between the bottle. In Figures 1, 2, and 3, suitable ice ledges 24 and 25 are shown secured to the end and side walls, respectively, of the crate and have portions cut away, as shown in Figure 1, which register with the cutaway portions or notches, shown at 12, 13 and 14 in the edges of the horizontal plate member 9 of the grid. The auxiliary members or ice ledges 24 and 25 thus cooperate with the plate member 9 to complete the formation of the circular openings which receive the bottles positioned adjacent the walls of the crate. When the auxiliary members 24 and 25 are used in the construction of a crate, they cooperate with the plate member 9 to close the openings between the bottles and the walls of the crate, whereby ice may be supported in the crate directly upon the plate member 9 and said auxiliary members 24 and 25. The auxiliary members 24 and 25 are fitted between the slats of the walls of the crate and are secured in position by suitable pins or rivets 26 passing through apertures in the members 24 and 25 and received in suitable sockets provided in the walls of the crate, as best shown in Figures 1 and 3. Ribs 20 reinforce the inwardly projecting reduced portions of the auxiliary members 24 and 25, and have their outer ends abuttingly engaging the adjacent surfaces of the crate walls, as best shown in Figures 1 and 3.

The cross members 17 of the crate are shown supported upon the side walls 3—3 by suitable brackets 27 secured to the ends of said members by suitable rivets 28. The brackets 27 have outwardly projecting flanged portions 29 fitting between contiguous slats of the side walls of the crate, and secured therebetween by suitable pins or rivets 31, as clearly illustrated in Figure 3.

Figures 6, 7, and 8 illustrate a construction in which the grid 10 is supported directly upon a plurality of metallic cross members or hangers 32, preferably shaped as shown in Figures 6 and 7, and having their upper flanged end portions 33 received between the slats forming the lower portion of the side walls 3 of the crate, as best shown in Figure 6. Pins or rivets 34 secure the cross members or hangers 32 in position in the crate.

The upright posts 15 of the grid are secured to the hangers 32 by suitable plugs 21, similar to the ones shown in Figure 1, and which plugs are secured to the hangers by suitable rivets 35. The restricted portions 36 of the hangers 32 are provided with suitable openings 37 in their upper walls adapted to receive cushion elements 38, having portions 39 adapted to be received in the openings 37, as clearly illustrated in Figure 6. The upper enlarged portions of the cushion elements 38 project beyond the vertical walls of the hangers 36, as clearly illustrated in Figure 7, and are dapted to be engaged directly by the bottle. Suitable rods 41 are received in apertures provided in the hangers 32 and have their ends suitably supported in the end walls 2 of the crate. These rods 41 and hangers 36 constitute the bottom of the crate and support the bottles therein. Auxiliary grid members 24 and 25 are also shown embodied in the construction of the crate illustrated in Figures 6 and 7. These, however, may be omitted, if desired.

In the crate provided with a grid, such as illustrated in Figures 6 and 7, the vertical walls of the bottle do not contact directly with any metal. The bottles are spaced apart in substantially the same manner illustrated in Figures 1 and 2, as the upper horizontal plate member 9 of the grid 10 cooperates with the auxiliary members 24 and 25 to laterally support the upper portions of the bottles, and the cushion elements 38 prevent the lower vertical wall portions of the bottles from contacting directly with the metallic hangers 36.

Figures 9 and 10 illustrate a construction in which the grid 10 is supported upon a metallic bottom member, generally indicated by the numeral 42. This bottom member is shown formed from a single piece of sheet metal, and has its opposite side edge portions 43 bent upwardly and outwardly whereby they may be received between certain of the slats of the lower portions of the side walls of the crate, as clearly illustrated in Figure 9. Rivets or pins 44 prevent the bottom member 42 from relatively moving in the crate.

The upright posts 15 of the grid 10 are supported directly upon the bottom member 42, and are secured thereto by suitable plugs 21 and rivets 35, in a manner similar to that shown in Figure 6. Cushion elements 45 are secured to the bottom member by suitable rivets 46 and are adapted to be engaged by the bottoms of the bottles, to thereby prevent the bottles from directly contacting with said metallic bottom member 42. The heads of the rivets 46, it will be noted, are received in depressions formed in the upper faces of the cushion elements 45, whereby they cannot contact directly with the bottoms of the bottles.

The grid 10 in Figure 9 is shown provided with an auxiliary plate member 47, which is formed in substantially the same manner as the plate portion 9 of the grid 10, except that it does not include the upright posts 15. The plate member 47, on the other hand, is provided with suitable apertures 48 adapted to receive the posts 15 of the grid plate 9, whereby the auxiliary grid plate 47 may be secured to the posts 15 at an elevation below the upper plate member 9. The contour of the auxiliary plate member 47 corresponds to that of the grid plate 9, as will readily be understood by reference to Figure 10. By the provision of the auxiliary grid plate 47, the bottles are supported adjacent their lower ends, whereby they cannot tilt in the crate when the latter is inclined or tilted, as when the crate is carried by one end, by a person grasping hold of it by means of one of the usual hand holes 49, provided in the end walls 2 of the crate.

To prevent the bottles from contacting directly with the upright portions 43 of the bottom member 42, suitable openings 51 are provided in said upright portions 43, which are alined with the bottles, as clearly illustrated in Figure 10, whereby the walls of the bottles will contact with the wooden slats of the side walls of the crate, and not with the metallic upright portions 43 of the bottom member 42. The bottom member 42 of the crate is provided with suitable openings 52, whereby the crate may readily be cleaned by projecting water or steam directly therethrough from either the top or bottom.

Figure 12:
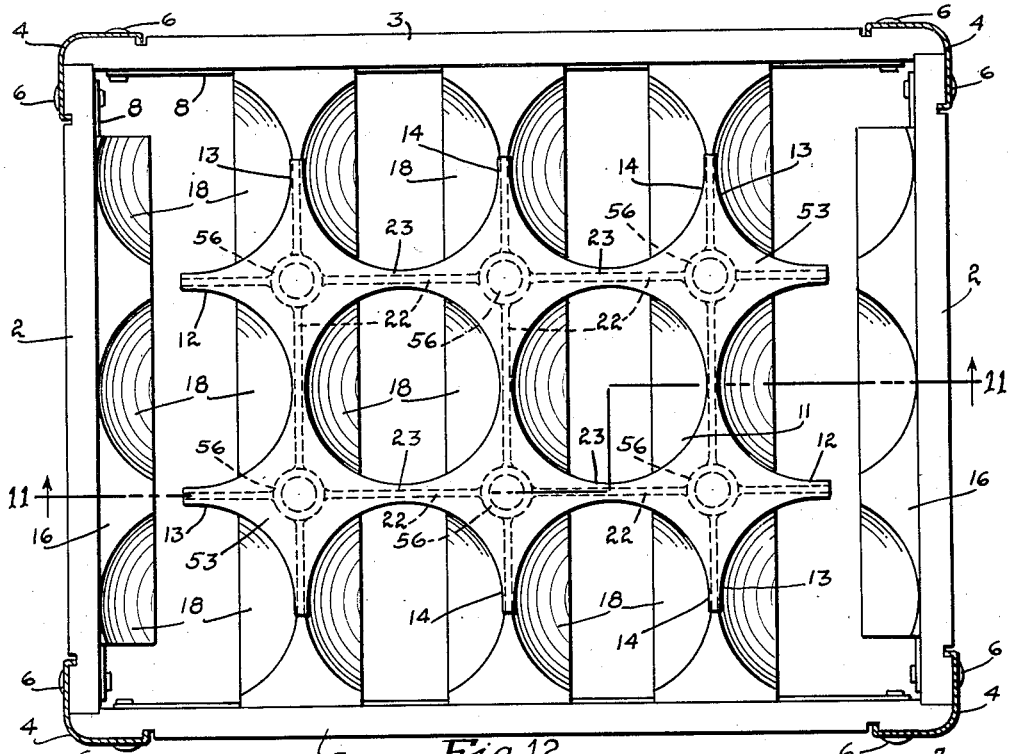
Figure 12 is a sectional plan view on the line 12—12 of Figure 11.
Figure 11:
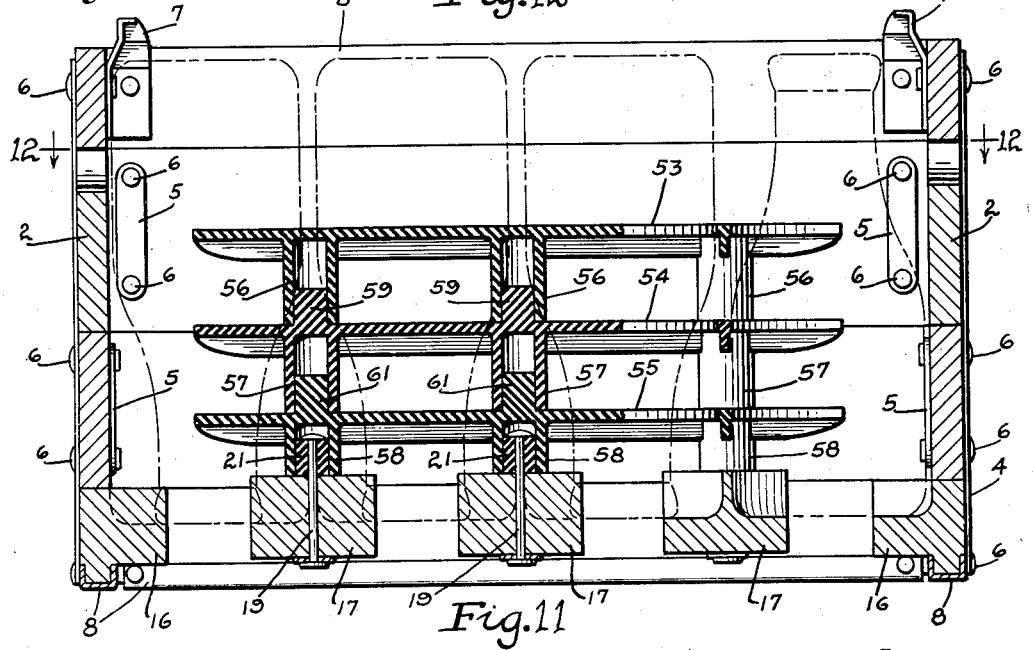
Figure 11 is a vertical sectional view on the line 11—11 of Figure 12, showing a grid comprising a plurality of plate members suitably secured together to provide a unitary grid structure having no direct connections with the vertical walls of the crate.
Figure 13:
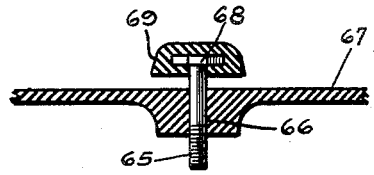
Figure 13 is an enlarged detail sectional view showing a grid in which the upper horizontal plate member is formed independently of the supporting posts.

Figures 11 and 12 illustrate a crate whose vertical walls, and also the bottle supporting means or members 16 and 17 at the bottom of the crate, are substantially the same as those shown in Figures 1 and 2, and these parts will therefore be indicated by like numerals.

The grid, shown in Figures 11 and 12, however, differs from those shown in the previous figures, in that it is composed of a plurality of plate members 53, 54, and 55, each provided with depending tubular portions 56, 57, and 58, respectively, as clearly illustrated in Figure 8. The tubular members 56 and 57 of the grid plates 53 and 54 are adapted to receive the upstanding plugs 59 and 61 on the plate members 54 and 55, respectively, and are secured thereto by suitable gumming. The tubular members 58 of the lower plate member 55 are secured to the cross members 17 of the crate by suitable plugs 21 and rivets 19, in a manner similar to that shown and described with reference to Figures 1 and 2.

When the grid plates 53, 54, and 55 are secured together, as shown in Figure 11, they provide a unitary structure which is supported entirely upon the bottom cross members 17 of the crate, and they have no direct connections with the side walls thereof, as will be clearly seen by reference to Figure 11. The plate members 53, 54, and 55 are molded of a suitable non-metallic material, such as rubber, and when secured together, as shown in Figure 11, provide a very substantial and rugged grid structure, which is capable of flexing and yielding, when subjected to abnormal strains, and in which the bottles cannot rattle or vibrate and thereby cause the crate to become noisy, particularly when filled with empty bottles, this being brought about because of the flexible and sound-proof nature of the bottle spacing and supporting means. By constructing the grid, as shown in Figure 11, it may be made to any desired height by simply increasing or decreasing the number of sections constituting said grid.

In some creameries, the bottles are washed and sterilized while supported in an inverted position in the crates, and in such cases, the grid must be high enough to engage the bottles at their largest diameters, to thereby prevent them from tilting to an inclined position, as will readily be understood by reference to Figure 11. In other creameries where the bottles are removed from the crates for washing, the grids in the crates need not be so high and are preferably constructed as shown in Figures 1, 6, and 9.

Figures 13 to 16, inclusive, show a grid plate provided with separate supporting means suitably secured thereto. The form shown in Figure 13 comprises a tubular post or member 62 having a reduced opening 63 at its upper end adapted to receive a suitable bushing 64, threaded to receive the lower end of a suitable screw 65. The screw 65 is received in an aperture 66 provided in the grid plate 67, and has an enlarged head 68, shown encased in a member 69, preferably molded directly onto the head 68 and formed of a suitable water-proof material such, for example, as rubber. The lower end of the tubular post 62 is adapted to be secured to the bottle supporting means at the bottom of the crate, in a manner similar to that shown and described with reference to the previous figures.

Figure 14:
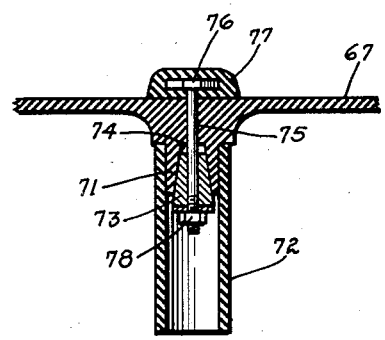
Figure 14 is a view showing another construction in which the upper horizontal plate member of the grid is secured to the upper ends of the tubular supporting members or posts by a tapered wedge-like device.

Figure 14 shows a construction in which the grid plate 67 is provided with a depending cylindrical extension 71 adapted to be received in the upper end of a tubular post 72. The post 72 is secured to the cylindrical portion 71 by means of a tapered element or plug 73, received in a tapered bore 74 provided in the cylindrical extension 71. A bolt 75 passes through the tapered plug 73 and has a head 76 embedded in an element 77, similar to the one shown in Figure 13. When the nut 78 of the bolt 75 is tightened, the tapered plug 75 expands the walls of the cylindrical extension 71 and thereby secures the same to the upper end of the post 72.

Figure 15:
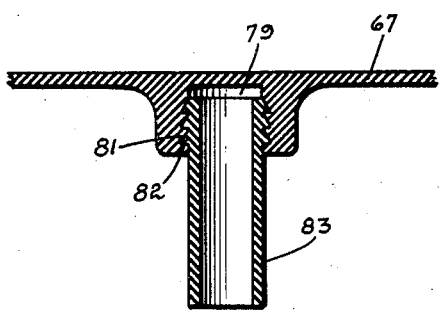
Figure 15 shows another construction in which the upper ends of the tubular members are received in sockets provided in the grid plate, and are interlocked with the walls of said sockets.

Figure 15 shows a construction in which the grid plate 67 is provided with a socket 79 having annular grooves 81 therein adapted to receive correspondingly shaped teeth 82, provided on the upper end of a tubular post 83. The grooves 81 and teeth 82 are shaped as shown in Figure 15 whereby, when the upper end of the post is pressed into the socket 79, it cannot again be removed therefrom. If desired, gum may be applied to the walls of the socket 79 to thereby positively prevent the tubular member 83 from becoming detached from the grid plate 67.

Figure 16:
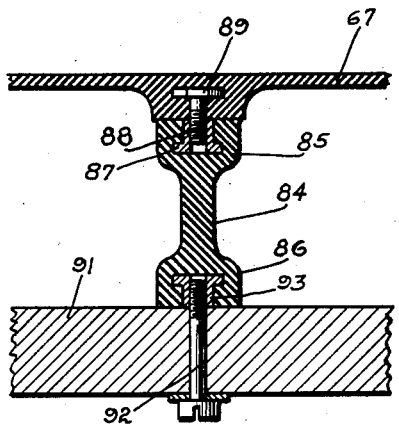
Figure 16 illustrates another construction in which the grid plate is supported upon flexible non-tubular posts suitably secured thereto.

Figure 16 illustrates a construction in which the grid plate 67 is supported upon a plurality of posts 84 having enlarged end portions 85 and 86. A sleeve 87 is molded into the upper end of the post 84 and is adapted to receive the threaded terminal of a screw 88, whose head 89 is embedded in the grid plate 67. The lower end of the post 84 is shown secured to a cross rail or supporting member 91 of the crate, by means of a bolt 92 having its threaded end portion received in a sleeve or bushing 93 embedded in the head 86 of the post 84.

Figure 5:
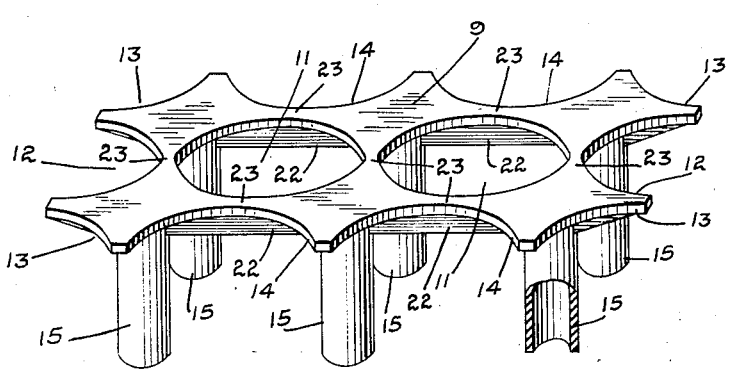
Figure 5 is a perspective view showing the grid removed from the crate.

The novel bottle crate herein disclosed, has been found very practical and efficient in actual use. By constructing the grid, as best shown in Figure 5, it may be quickly assembled in a crate by simply fitting the lower ends of the tubular posts 15 thereof, over the plugs 21 secured to the cross members 17 of the crate. The grid is preferably molded of a suitable rubber composition which is more or less flexible, and is water-proof and acid-resisting. It is also to be noted that the upper horizontal plate portion 9 of the grid is not secured directly to the vertical walls of the crate, but is supported entirely upon the tubular posts or members 15, which have their lower ends secured to the cross members 17, as shown in Figure 1. By thus supporting the plate portion 9, the vertical walls of the crate may readily be cleaned without interference from the grid.

Another important feature of the invention resides in the fact that the walls of the bottles do not contact with any metal. The bodies of the bottles are prevented from contacting directly with metal because of the entire grid being constructed of rubber, which does not injure the walls thereof, even though the crates are roughly handled.

Also, by spacing apart the bottles as herein disclosed, the bodies of the bottles are cushioned, so that when the crate is filled with bottles, regardless of whether the bottles are empty or filled, the crate will be quiet and substantially noiseless. Bottle crates, as now commonly constructed with metallic grids, are objectionable because of the noise resulting from the bodies of the bottles constantly impinging against the metallic grids, and also because of the walls of the bottles becoming marred and stained by constantly contacting with said metallic grids. All of these objectionable features have been eliminated in the crate herein disclosed and, in addition, the construction of the crate has been simplified, in that the operation of mounting the grid in the crate is less complicated, as will be readily understood by reference to the drawings.

I claim as my invention:

1. The combination with a bottle crate comprising a plurality of walls and means for supporting the bottles therein, of a grid structure for spacing apart the bottles therein, said grid comprising a rubber plate member, and flexible means for supporting said plate member directly upon said bottle supporting means.

2. The combination with a bottle crate comprising a plurality of walls and means for supporting the bottles therein, of a grid structure for spacing apart the bottles, said grid comprising a horizontally disposed plate member, and flexible means for supporting said plate member upon said bottle supporting means and in spaced relation to the crate walls, whereby the plate member may relatively move horizontally, when subjected to an abnormal strain.

3. The combination with a bottle crate comprising a plurality of walls and means for supporting the bottles therein, of a grid structure comprising a horizontally disposed flexible rubber plate member, and means supported on the walls of the crate and cooperating with said plate member to space apart the bottles.

4. The combination with a bottle crate comprising a plurality of walls and means for supporting the bottles therein, of a grid structure comprising a horizontally disposed flexible rubber plate member, and means supported on the walls of the crate and cooperating with said plate member to space apart the bottles, said plate member being supported independently of said wall supported means.

5. In a crate of the class described, means in the bottom thereof for supporting the bottles, a grid supported directly on said supporting means and comprising a plurality of upright posts having a flexible plate member secured to the upper ends thereof and provided with suitable openings for receiving the bottles, said plate member and posts being integrally formed of a suitable material capable of flexing when pressure is applied thereto.

6. In a crate of the class described, means at the bottom thereof for supporting the bottles, a grid comprising a plurality of upright flexible posts supported upon said bottle supporting means, a plate member secured to the upper ends of said posts and provided with suitable openings for receiving bottles, and means on the walls of the crate cooperating with said plate member for spacing apart the bottles adjacent to the walls of the crate, said flexible posts permitting said plate member to relatively move laterally, when subjected to abnormal strains.

7. In a crate of the class described, means at the bottom thereof for supporting the bottles, a grid comprising a plurality of upright tubular posts supported entirely upon said bottle supporting means, a plate member secured to the upper ends of said posts and provided with suitable openings for receiving bottles, and inwardly projecting means supported on the walls of the crate independently of said plate member, and cooperating therewith to space apart the bottles adjacent to the walls of the crate.

8. In a crate of the class described, a plurality of cross members in the bottom of the crate for supporting the bottles, and a grid comprising a flexible rubber plate member having openings therein for receiving bottles, and a plurality of hollow, yieldable posts integrally formed with said plate member and depending therefrom and having their lower ends suitably secured to said cross members, whereby the plate member is spaced upwardly therefrom.

9. In a crate of the class described, a plurality of cross members in the bottom of the crate for supporting the bottles, upwardly extending projections on said cross members, and a grid comprising a horizontally disposed flexible plate member having a plurality of hollow posts integrally formed therewith and depending therefrom, the lower ends of said posts being adapted to receive said projections to thereby secure the grid in the crate.

10. In a crate of the class described, means in the bottom of the crate for supporting the bottles, and a grid supported on said bottle supporting means and comprising a horizontally disposed flexible plate member having a plurality of posts depending therefrom, whose lower ends are mounted upon and secured to said bottle supporting means, said plate member and posts being capable of returning to their normal positions, when temporarily distorted or bent out of shape by an abnormal force.

11. In a crate of the class described, cross members at the bottom thereof for supporting the bottles, a grid supported on said cross members and comprising a horizontally disposed rubber plate member having a plurality of tubular rubber posts depending therefrom whose lower ends are suitably secured to said cross members, said plate member and posts being capable of flexing when subjected to abnormal forces, and means on said cross members for preventing direct contact of the bottles therewith.

12. In a crate of the class described, means in the bottom thereof for supporting the bottles, and a grid secured to said bottle supporting means and comprising a plurality of superimposed flexible plate elements having alined openings therein for receiving the bottles.

13. In a crate of the class described, means in the bottom thereof for supporting the bottles, and a grid for spacing apart the bottles, comprising a plurality of superimposed flexible plate members supported directly upon said cross members and having openings therein for receiving the bottles.

14. In a crate of the class described, means in the bottom thereof for supporting the bottles, a grid for spacing apart the bottles, comprising a plurality of superimposed flexible plate members supported upon said cross members and having openings therein for receiving the bottles, and interfitting means on said plate members for securing them together in vertically spaced relation.

15. In a crate of the class described, metallic cross members in the bottom thereof having a plurality of rods interconnected therewith for supporting the bottles, a grid for spacing apart the bottles in the crate comprising a plurality of upright flexible posts secured directly to said cross members, a horizontally disposed flexible plate member secured to the upper ends of said posts and having openings therein for receiving the bottles, and cushion elements secured to said cross members to thereby prevent the bottles from contacting directly therewith.

16. In a crate of the class described, a metallic frame forming the bottom of the crate, a plurality of resilient elements secured to said frame in spaced relation and each adapted to support a bottle, and a grid comprising a plurality of flexible posts having their lower ends mounted upon and secured to said frame, and a horizontally disposed plate member secured to the upper ends of said posts and having suitable openings therein for receiving the bottles, said plate member and resilient elements preventing the bottles from contacting directly with said frame.

17. A grid for spacing apart the bottles in a crate comprising a flexible plate member having a plurality of flexible posts integrally formed therewith for supporting said plate member directly on the bottom of the crate.

18. A grid for spacing apart the bottles in a crate comprising a horizontal plate member having a plurality of tubular posts integrally formed therewith to provide a unitary structure, said plate and posts being formed of rubber whereby they are capable of flexing when subjected to abnormal pressures.

19. A one-piece flexible grid for spacing apart the bottles in a crate, comprising an upper horizontal plate member having openings therein for receiving the bottles, and a plurality of depending tubular posts integrally formed with said plate member, said grid, as a whole, being formed from a suitable flexible material, such as rubber.

20. In a bottle crate, a plurality of walls, means in the bottom of the crate for supporting the bottles, and bottle spacing means in said crate comprising a unitary structure including a plate and depending supports therefor and fitting between the walls of the crate and constructed of a flexible stretchable and compressible material bendable in substantially all directions and capable of being distorted or bent out of shape, when subjected to abnormal forces, the inherent flexibility of said bottle spacing means causing it to return to its normal shape, when said abnormal force is released therefrom.

21. A bottle crate comprising a plurality of walls, means therein for supporting the bottles, a plurality of expandible projections on said bottle spacing means, a grid for spacing apart the bottles in said crate, said grid comprising a plurality of tubular members having their lower ends fitting over said projections, and means for expanding said projections thereby to secure the tubular members to the bottle spacing means.

HENRY V. BOWMAN.